Dec. 20, 1938.  V. W. KLIESRATH  2,140,750
BRAKE
Filed Jan. 28, 1938
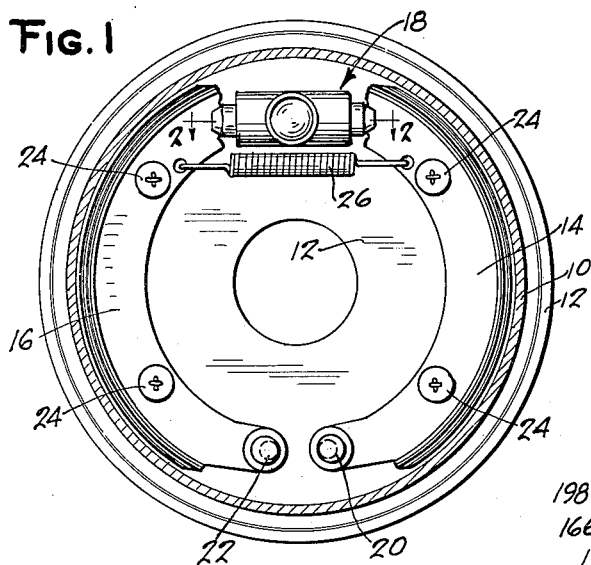
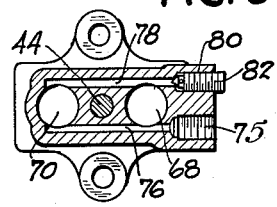
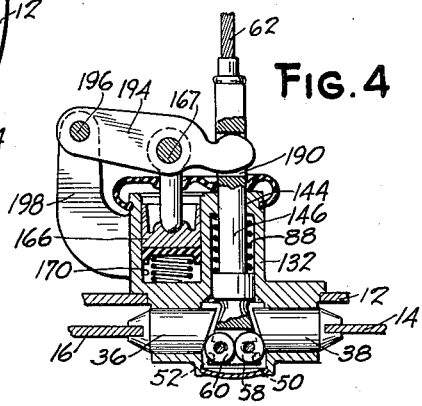
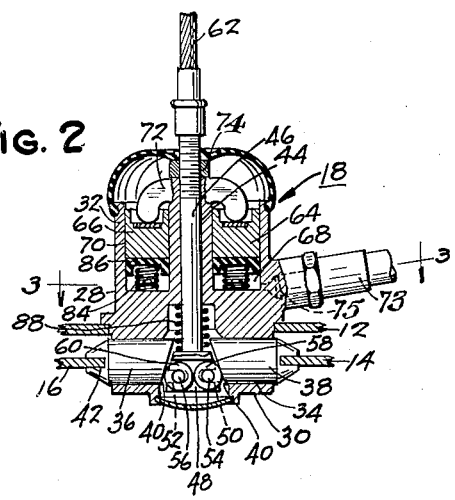
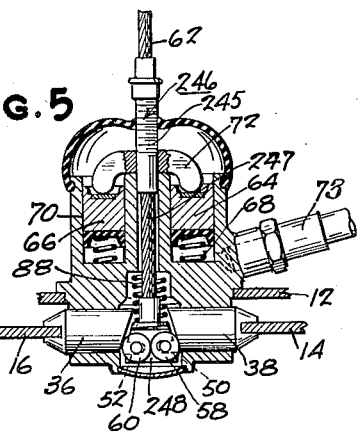
INVENTOR.
VICTOR W. KLIESRATH
BY Jerome R. Cox
ATTORNEY.

Patented Dec. 20, 1938

2,140,750

UNITED STATES PATENT OFFICE 2,140,750

BRAKE

Victor W. Kliesrath, South Bend, Ind., assignor to Bendix Products Corporation, South Bend, Ind., a corporation of Indiana Application January 28, 1938, Serial No. 187,351

11 Claims. (Cl. 188—106)

This invention relates to brakes and is illustrated as a wheel brake for a road wheel of an automobile or similar vehicle.

One of the objects of this invention is the provision of combined hydraulic and mechanical actuation for a brake of this character.

Further objects and features of the invention will be apparent after a reading of the subjoined specification and claims and after a consideration of the accompanying drawing, in which:

Figure 1 is a view in section of a brake showing the interior of the brake drum, the brake shoes and the actuating means;

Figure 2 is a sectional view taken substantially on the line 2—2 of Figure 1;

Figure 3 is a sectional view taken substantially on the line 3—3 of Figure 2;

Figure 4 is a sectional view similar to the view of Figure 2 but showing a modified embodiment; and Figure 5 is a sectional view similar to Figures 2 and 4 but showing a further modification.

Referring in detail to the drawing, it may be seen that I have shown in Figures 1, 2 and 3 a brake drum 10 with which there is associated a backing plate 12 and within which there are positioned brake shoes 14 and 16 and an actuating unit 18. The shoes 14 and 16 are pivoted on anchors 20 and 22 respectively, the anchors being secured to the backing plate 12. The shoes are provided with steady rests such as the steady rests 24 and with a retracting spring 26 which is connected between the two shoes and tends to urge them to the released position as shown.

The shoes may be applied to the drum for braking by means of the actuator 18. This actuator comprises a casing 28 secured to the backing plate 12 and having a portion 30 which extends within the brake drum and a portion 32 which is positioned outside of the brake drum. The portion 30 within the brake drum is provided with a bore 34 within which there is a pair of plungers 36 and 38 each formed with an inclined surface such as 40 for purposes later to be described, and each provided with a slot such as 42 within which slots the ends of shoes 14 and 16 extend. The actuator 18 is also provided with an axial bore 44 extending perpendicularly to the bore 34. Within the bore 44 there is positioned a plunger 46, the inner end of which is provided with a forked head 48, each furcation of which is provided with a corresponding pair of opposed slots 50 and 52 which respectively receive reduced end portions 54 and 56 of rollers 58 and 60. The reduced end portions 54 and 56 of the rollers 58 and 60 are thus free to rotate in their associated slots 50 and 52 and are free to move in said slots perpendicularly of the axis of the plunger 46 but are restrained against movement in the direction of the axis of the plunger. Movement of the plunger 46 outward therefore causes the rollers 58 and 60 to roll upon each other and upon the inclined surfaces 40 of the plungers 36 and 38 and to force the plungers 36 and 38 apart. The plunger 46 may be urged outward in a variety of ways. For instance, the cable 62 connected to the outer end thereof is adapted to exert pulling force upon the plunger 46. On the other hand, hydraulic pressure may be applied to the plunger 46 by means of pistons 64 and 66 positioned respectively in cylinders 68 and 70 and both acting on the ends of the yoke 72 which acts through the nut 74 also to urge the plunger 46 outward. Hydraulic fluid under pressure is supplied to the cylinders 68 and 70 through a fluid conduit 73 connected to an inlet opening 75 which as is shown more clearly in Figure 3 is connected through the bore 76 with the cylinders 68 and 70. A similar bore 78 connects the cylinders 68 and 70 with a bleed opening 80 in which there is normally positioned a bleeder screw 82. Springs such as 84 normally maintain cups 86 in contact with their associated pistons, and a retracting spring 88 is arranged to move the plunger 46 inward whenever pressure therein is relieved.

It is believed that the operation of the device illustrated will be readily understood. The brake may be applied either hydraulically or mechanically. Mechanical applying force acting on the cable 62 moves the plunger 46 outward and the rollers 58 and 60 rolling on each other and on the inclined surfaces 40 of the plungers 36 and 38 spread the plungers 36 and 38 apart, thus spreading the shoes 14 and 16 into contact with the brake drum 10. The rotating drum is thus retarded, the torque being absorbed by the anchors 20 and 22. When hydraulic applying force is employed, hydraulic fluid under pressure is supplied through the conduit 73 to force the pistons 64 and 66 outward. The outwardly moved pistons act on opposite ends of the yoke 72 and through the nut 74 move the plunger 46 outward. The movement of the plunger 46 in the manner above described causes application of the shoes 14 and 16 to the drum to retard the motion of the drum.

It will be noted that if, due to uneven adjustment or wear, the clearance of one of the shoes 14 or 16 is greater than the other, thereby necessitating a greater movement of the respective plungers 38 or 36, the rollers 58 and 60 may move slightly in the slots 50 and 52 in the direction of one or the other of said plungers to apply the shoes with equal force.

In the arrangement shown in Figure 4, like parts are designated by the same numerals as in Figures 1 to 3 inclusive. The plunger 146 is formed with a longitudinal slot 190 within which there is positioned the end of a lever 194 pivoted at 196 on a bracket 198 fastened to the casing 132. The casing 132 is provided with a cylinder bore 170 at one side of the plunger bore 144. Within this bore 170 there is provided a piston 166 pivotally connected as at 167 with the lever 194. The single cylinder 170 thus performs the purpose of the two cylinders 68 and 70 and is able to act through the lever 194 to exert applying force on the plunger 146.

In the device shown in Figure 5, like parts are also designated by the same numerals. The plunger 246 however is formed of three parts and comprises a head portion 248, a threaded portion 245 to which there is connected the cable 62 and an interconnecting cable 247 connecting the head portion 248 with the threaded portion 245. This arrangement operates in exactly the same manner as the arrangement shown in Figures 1 to 3 inclusive except that by reason of the flexible connection the head portion 248 may shift in either direction as the shoes are applied, thus providing a much greater compensation for unequal applying movement of the shoes. This type of actuator is especially useful with a duo servo type of brake in which the shoes shift to anchor depending upon the direction of rotation of the drum.

It is to be understood that the above-described embodiments of my invention are for the purpose of illustration only and various changes may be made therein without departing from the spirit and scope of the invention.

I claim:

1. A brake comprising a drum, a pair of shoes, an actuating member having a portion positioned between said shoes and having a bore extending through said portion, a pair of plungers positioned in said bore, each of said plungers being formed with an inclined inner end and having its outer end in operative engagement with one of said shoes, a pair of rollers arranged to contact with the inner ends of said plungers, and a plurality of means for moving said rollers along said inclined surfaces for forcing said plungers outwardly and moving said shoes into drum contact, one of said means being mechanical and the other means being hydraulic.

2. A brake comprising a drum, a pair of shoes, an actuating member having a portion positioned between said shoes and having a bore extending through said portion, a pair of plungers positioned in said bore, each of said plungers being formed with an inclined inner end and having its outer end in operative engagement with one of said shoes, a pair of rollers arranged to contact with the inner ends of said plungers, and a plurality of means for moving said rollers along said inclined surfaces for forcing said plungers outwardly and moving said shoes into drum contact, one of said means being mechanical and the other means being hydraulic, said hydraulic means comprising a hydraulic motor secured outside of said backing plate.

3. A brake comprising a drum, a pair of shoes, an actuating member having a portion positioned between said shoes and having a bore extending through said portion, a pair of plungers positioned in said bore, each of said plungers being formed with an inclined inner end and having its outer end in operative engagement with one of said shoes, a pair of rollers arranged to contact with the inner ends of said plungers, and a plurality of means for moving said rollers along said inclined surfaces for forcing said plungers outwardly and moving said shoes into drum contact, one of said means being mechanical and the other means being hydraulic, said hydraulic means comprising a hydraulic motor secured outside of said backing plate and acting on a plunger connected to said rollers and said mechanical means also acting on said plunger.

4. A brake comprising a drum, a pair of shoes, an actuating member having a portion positioned between said shoes and having a bore extending through said portion, a pair of plungers positioned in said bore, each of said plungers being formed with an inclined inner end, and having its outer end in operative engagement with one of said shoes, a pair of rollers arranged to contact with the inner ends of said plungers, and a plurality of means for moving said rollers along said inclined surfaces for forcing said plungers outwardly and moving said shoes into drum contact, one of said means being mechanical and the other means being hydraulic, said hydraulic means comprising a hydraulic motor secured outside of said backing plate and acting on a plunger connected to said rollers and said mechanical means also acting on said plunger, said plunger extending through a bore in said actuator to a position outside of the backing plate.

5. A brake comprising a drum, a pair of shoes, an actuating member having a portion positioned between said shoes and having a bore extending through said portion, a pair of plungers positioned in said bore, each of said plungers being formed with an inclined inner end and having its outer end in operative engagement with one of said shoes, a pair of rollers arranged to contact with the inner ends of said plungers, and a plurality of means for moving said rollers along said inclined surfaces for forcing said plungers outwardly and moving said shoes into drum contact, one of said means being mechanical and the other means being hydraulic, said hydraulic means comprising a pair of cylinders secured outside of the backing plate and both contacting with a yoke secured to a plunger connected to said rollers.

6. A brake comprising a drum, a pair of shoes, an actuating member having a portion positioned between said shoes and having a bore extending through said portion, a pair of plungers positioned in said bore, each of said plungers being formed with an inclined inner end and having its outer end in operative engagement with one of said shoes, a pair of rollers arranged to contact with the inner ends of said plungers, and a plurality of means for moving said rollers along said inclined surfaces for forcing said plungers outwardly and moving said shoes into drum contact, one of said means being mechanical and the other means being hydraulic, said hydraulic means comprising a pair of cylinders secured outside of the backing plate and both contacting with a yoke secured to a plunger connected to said rollers, said hydraulic cylinders being interconnected.

7. A brake comprising a drum, a pair of shoes, an actuating member having a portion positioned between said shoes and having a bore extending through said portion, a pair of plungers positioned in said bore, each of said plungers being formed with an inclined inner end and having its outer end in operative engagement with one of said shoes, a pair of rollers arranged to contact with the inner ends of said plungers, and a plurality of means for moving said rollers along said inclined surfaces for forcing said plungers outwardly and moving said shoes into drum contact, one of said means being mechanical and the other means being hydraulic, said hydraulic means comprising a pair of cylinders secured outside of the backing plate and both contacting with a yoke secured to a plunger connected to said rollers, said last named plunger being positioned intermediate said hydraulic cylinders.

8. A brake comprising a drum, a pair of shoes, an actuating member having a portion positioned between said shoes and having a bore extending through said portion, a pair of plungers positioned in said bore, each of said plungers being formed with an inclined inner end and having its outer end in operative engagement with one of said shoes, a pair of rollers arranged to contact with the inner ends of said plungers, and a plurality of means for moving said rollers along said inclined surfaces for forcing said plungers outwardly and moving said shoes into drum contact, one of said means being mechanical and the other means being hydraulic, said hydraulic means comprising a cylinder, a piston in said cylinder, a lever pivoted on said cylinder and operatively engaged by said piston, and means for connecting said lever to said rollers.

9. A brake comprising a drum, a pair of shoes, an actuating member having a portion positioned between said shoes and having a bore extending through said portion, a pair of plungers positioned in said bore, each of said plungers being formed with an inclined inner end and having its outer end in operative engagement with one of said shoes, a pair of rollers arranged to contact with the inner ends of said plungers, and a plurality of means for moving said rollers along said inclined surfaces for forcing said plungers outwardly and moving said shoes into drum contact, one of said means being mechanical and the other means being hydraulic, said hydraulic means comprising a hydraulic motor secured outside of said backing plate, said mechanical means comprising a cable connected to said rollers.

10. A brake comprising a drum, a pair of shoes, an actuating member having a portion positioned between said shoes and having a bore extending through said portion, a pair of plungers positioned in said bore, each of said plungers being formed with an inclined inner end and having its outer end in operative engagement with one of said shoes, a pair of rollers arranged to contact with the inner ends of said plungers, and a plurality of means for moving said rollers along said inclined surfaces for forcing said plungers outwardly and moving said shoes into drum contact, one of said means being mechanical and the other means being hydraulic, said hydraulic means comprising a hydraulic motor secured outside of said backing plate, said mechanical means comprising a cable connected to said rollers, and said hydraulic means acting on a yoke which is also connected to said rollers.

11. A brake comprising a drum, a pair of shoes, an actuating member having a portion positioned between said shoes and having a bore extending through said portion, a pair of plungers positioned in said bore, each of said plungers being formed with an inclined inner end and having its outer end in operative engagement with one of said shoes, a pair of rollers arranged to contact with the inner ends of said plungers, and a plurality of means for moving said rollers along said inclined surfaces for forcing said plungers outwardly and moving said shoes into drum contact, one of said means being mechanical and the other means being hydraulic, said actuating member also having a portion extending outside of said backing plate.

VICTOR W. KLIESRATH.